Patented June 2, 1942

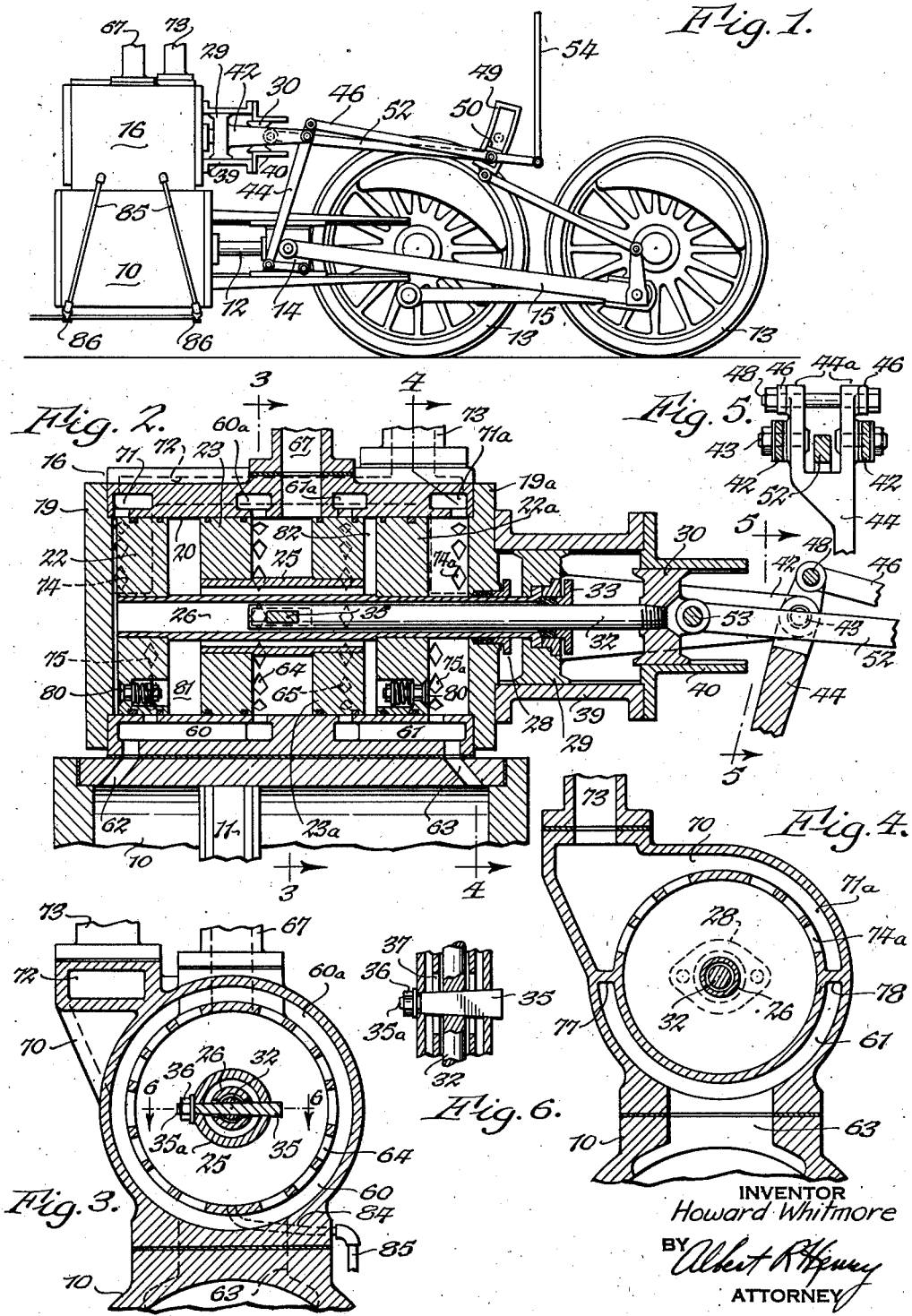

2,285,320

UNITED STATES PATENT OFFICE 2,285,320

STEAM ENGINE VALVE

Howard Whitmore, Lockport, N. Y.

Application July 1, 1941, Serial No. 400,686

5 Claims. (Cl. 121—146)

This invention relates to valves and associated valve chests for controlling the entry and exhaust of steam to a steam engine.

The invention is particularly directed to valves of the piston type, and it is herein proposed to provide two sets of valves, and to install such valves in a common bore in a valve chest, with the dual object of providing a more serviceable structure and of rendering available more extensive port areas than have heretofore been obtained in devices of this general nature. The invention contemplates a novel means of connecting and operating each set of valves so that an extremely sharp cut-off may be obtained, which feature, together with the increased port areas, is calculated to permit the operation of a steam engine under a lower back pressure than has previously been possible.

Other features of the invention, including an effective method of operating the valves, are more specifically set forth in the accompanying specification and drawing, wherein:

Fig. 1 is a side view, showing the invention applied to a modified Walschaert link movement on a locomotive;

Fig. 2 is an enlarged longitudinal section through the steam chest and cylinder of Fig. 1;

Fig. 3 is a section on the line 3—3 of Fig 2, showing the steam inlet passage arrangement;

Fig. 4 is a section on the line 4—4 of Fig. 2;

Fig. 5 is a section on the line 5—5 of Fig. 2; and

Fig. 6 is a section on the line 6—6 of Fig. 3.

For exemplary purposes, the invention is shown organized with a cylinder 10 of a steam locomotive. The cylinder contains a piston 11 and a piston rod 12 therefor, which rod is connected to the driving wheels 13 through a conventional arrangement including a crosshead 14 and connecting rod 15. The valve chest 16 is secured to the top of the cylinder 10, and it will be observed that two valve operating rods or devices project therefrom for operation by a suitable valve operating linkage, which in Fig. 1 is shown as a modified form of the well known Walschaert gear.

The valve chest 16 is capped by heads 19 and 19a, and it contains a bore 20 of uniform diameter, within which piston valves 22, 23, 23a, and 22a are slidably mounted. The inner valves 23, 23a control the steam inlet to the cylinder 10, and they are connected for common movement by a sleeve 25. The outer or exhaust valves 22, 22a are connected by a smaller sleeve 26, which extends through the sleeve 25 and in addition extends through a stuffing box 28 in the right hand head 19a, where it is rigidly connected to a cross head 29.

A second or outer crosshead 30 carries a rod 32, which rod extends through a gland 33 in the crosshead 29, and then projects telescopically into the inner sleeve 26. The rod 32 is connected to the large sleeve 25 by a tapered key 35 having a threaded terminal 35a for receiving a tightening nut 36 (Fig. 6). The small sleeve 26 is slotted as indicated by the numeral 37 to permit the free passage of the key 35.

The crossheads 29 and 30 are mounted in slides 39 and 40, respectively, the inner slide 39 being secured to the head 19a and the slide 40 being secured to the slide 39. The crosshead 29 is provided with parallel extensions or arms 42, which straddle the smaller and outer crosshead 30, and at their extremities the arms are each pivotally secured by studs 43 to the bifurcated end 44a of a lead lever 44 of the Walschaert linkage. A pair of radius rods 46 are connected to the end 44a by a pivot stud 48, and such rods extend to a curved link 49 for pivotal connection with the link block 50 thereof.

The crosshead 30 is directly connected with the link block 50 by a radius rod 52, the pivotal connection between the cross-head and rod being indicated in Fig. 2 by the numeral 53. The free end of the rod 52 is connected to a hanger 54, which, as is well known in the art, is manually operated to vary the position of the link block 50 in the link 49, and thus to vary the cut-off and direction of operation of the engine.

Referring now to the port and passage arrangement of the piston valves, it will be seen in Figs. 2 to 4 that the lower half of the valve chest is formed with two cored delivery chambers 60, 61, which communicate with the left and right hand ends of the underlying cylinder 10 through passages 62 and 63, respectively. Narrower annular cored portions 60a and 61a branch directly from the chambers 60 and 61. The wall between the cored chambers and the bore 20 is pierced by circumferentially spaced admission port groups 64 and 65.

Live steam from the boiler enters the bore 20 directly through a passage 67, and thence out of the bore through one of the admission port groups 64 or 65.

The valve chest is also formed with an exhaust box 70 (Fig. 4) which generally constitutes cored chambers 71, 71a located in the upper half of the chest and connected by a longitudinal passage 72. A passage 73 leading back to the condenser of the steam system communicates with the passage 72. Ports 74 and 74a at the extremities of the bore 20 enter the chambers 71, 71a, respectively. In the lower half of the bore 20, and spaced slightly inward, are companion exhaust ports 75, 75a which establish communication between the left and right hand ends of the bore 20 and the cored chambers 60, 61, respectively. In Fig. 4 it will be seen that dividing walls 77, 78 separate the chambers 60, 61 from the chambers 71 and 71a.

The exhaust valves 22, 22a may be supplied with outwardly opening spring-pressed by-pass valves 80, which permit communication between the ends of the bore 20 and the spaces 81, 82 between the valves 22, 23 and 22a, 23a, respectively.

Thus, should condensates accumulate in such spaces, as the result of leakage past the pistons, it may be forced past the valves 80 and into the exhaust passages. Small drilled passages 84 also enter the spaces 81, 82, and such passages communicate with pipes 85 having suitably operated valves 86 at their lower ends. This permits the rapid removal of water from the valve system when the engine is started.

In the operation of the cylinder valves, it will be understood that the inlet valves 23, 23a are operated in unison through the crosshead 30 and rod 32, alternately to cover and uncover the admission port groups 64 and 65. In Fig. 2, live steam entering the bore 20 between the valves 23, 23a is directed through the uncovered port group 64 for entry into the chambers 60, 60a, whence it enters the left hand end of the engine cylinder 10 through the passage 62.

It will be seen that the exhaust pistons 22, 22a are positioned at this time to cover and seal the ports 74 and 75, and to uncover the left hand ports 74a, 75a. Thus, as the engine piston 11 moves to the right, spent steam is exhausted through the passage 63, chamber 61, ports 75a, 74a, chamber 71a, and thence to the passage 73. As the engine piston 20 reaches the end of its stroke, it will be observed that the valves may be reversed in an extremely short period of time, permitting a sharp cut-off, and thus efficient operation of the engine. It will be particularly noted that extremely large port areas are available compared to slide valve types of valve devices, and thus steam admission will be rapid, and steam exhaust will be substantially unimpeded, to the end that the operating back pressure will be held to a minimum.

While the invention has been described with reference to a specific adaptation, and with a particular type of operating gear, it will be apparent that it is not limited thereto, but may be otherwise embodied and controlled, within the scope of the following claims.

I claim:

1. In a valve chest for a steam engine, a cylindrical bore, four spaced reciprocable piston valves mounted in the bore, said valves being grouped in pairs consisting of the two outermost valves and the two innermost valves, means connecting the outermost valves for movement in unison, other means connecting the innermost valves for movement in unison, said last named means for connecting the innermost valves comprising a hollow sleeve having a large cross-sectional area, each of the innermost valves being formed with an aperture in communication with the interior of the sleeve, thereby providing a space for free fluid communication between the intervalve spaces existing between adjacent valves of each pair, whereby, upon relative motion of the valves in each pair, pressure equalization between said intervalve spaces is effected, ports formed in the cylinder bore and adapted to be alternately covered and uncovered by the movement of said valves to establish an operative sequence of admission, cut-off, and exhaust for said steam engine, and means for independently operating the valve pairs in timed relation.

2. In a valve chest for a steam engine, a cylindrical bore, four spaced reciprocable piston valves mounted in the bore, heads for the bore, the outer valves adjacent the heads being mutually interconnected for movement in unison, the inner valves being connected for movement in unison, said connections comprising a pair of sleeves, the inner valves being formed with aligned apertures of relatively large diameter to permit the passage therethrough of the sleeve connecting the outer valves, the sleeve connecting the inner valves entering said apertures and being spaced from the first named sleeve, thereby to provide a passage for free fluid communication between said sleeves and the spaces between adjacent outer and inner valves to equalize pressures, four sets of ports formed in the bore, each set being adjacent one of said valves and adapted to be alternately covered and uncovered by the movement thereof, passages connecting pairs of ports covered by the outer and inner valves with steam exhaust and admission means; and mechanism connected to the sleeves to operate the valves in timed relation to provide an operative sequence of steam admission, cut-off, and exhaust through the several ports.

3. In a valve chest for a steam engine, a cylindrical bore, said bore being formed with four sets of lineally spaced and circumferentially disposed ports, two of said sets providing admission ports and the other two providing exhaust ports, four spaced piston type valves reciprocably mounted in the cylinder, means for operating said valves in pairs to provide, in combination with the ports, an operative sequence of admission, cut-off, and exhaust for the piston of the steam engine; means providing a free fluid communication between the intervalve spaces between the adjacent valves of each pair; and additional valve means formed in the valves of one pair for connecting said spaces to the exhaust side of the steam chest upon the occurrence of predetermined pressures in the intervalve spaces, thereby to equalize pressures.

4. A valve chest for a steam engine comprising a cylindrical bore, heads for each end of the bore, four piston type valves reciprocably mounted in the bore, and comprising, in series order, an exhaust valve adjacent one head, two inlet valves adjacent the central portion of the bore, and another exhaust valve adjacent the opposite head, said inlet valves being formed with aligned central apertures of relatively large diameter, a hollow sleeve extending into said apertures and interconnecting said valves for movement in unison, a second sleeve of relatively small diameter extending through and freely spaced from the first named sleeve, said last named sleeve interconnecting the exhaust valves for movement in unison, means connected to said sleeves for independently operating the pairs of valves, said valves being spaced from each other, thereby to define intervalve spaces between the exhaust valve at each end and the adjacent inlet valve, said intervalve spaces being in free fluid communication by the passage defined by the apertures and the relatively large sleeve, thereby to effect pressure equalization, valve ports formed adjacent the central portion of the bore and adapted to be alternately covered and uncovered by the inlet valves, other ports formed adjacent the ends of the bore and adapted to be alternately covered and uncovered by the exhaust valves, a passage connecting the exhaust valve ports, and spring-loaded valves positioned in the exhaust piston valves and opening from the intervalve space to said exhaust ports upon occurrence of predetermined pressure conditions, thereby to relieve excess pressures developing therein.

5. A valve chest for a steam engine comprising a substantially cylindrical bore capped at each end by heads, a steam admission pipe connected to the bore at substantially the middle portion thereof and adapted to admit live steam to the central portion of the bore, a pair of lineally spaced, circumferentially disposed, cored passages formed in the bore adjacent the central portion, ports formed in the wall of the bore for communication with each of said cored passages, other lineally disposed cored passages formed in the bore in communication with the circumferential passages and terminating adjacent the ends of said bore, said passages providing admission ways to opposite ends of the steam engine cylinder, other series of circumferential ports formed adjacent each end of the bore, each of said series comprising sets of ports lineally spaced from each other, means for connecting the innermost of said last named ports with said lineal cored passages, partition walls formed in the body of said bore to prevent direct communication with the outermost of said last named ports, an exhaust manifold passage connecting said last named outermost ports, four piston valves in the bore, said valves being spaced and each one of said valves being positioned to alternately cover and uncover one of the named sets of inlet and exhaust ports, thereby to provide operative sequences of admission, cut-off, and exhaust for each end of the engine cylinder, a hollow sleeve connecting the inlet valves, said sleeve providing free fluid communication between the spaces between adjacent inlet and exhaust valves, and pressure-relief valves formed in the exhaust valves to effect release of excess pressure in the spaces between adjacent inlet and exhaust valves to the head ends of the bore and thereby to the exhaust manifold passage.

HOWARD WHITMORE.